(12) United States Patent
Shimizu et al.

(10) Patent No.: US 10,252,222 B2
(45) Date of Patent: Apr. 9, 2019

(54) HOLLOW FIBER TYPE SEMIPERMEABLE MEMBRANE, METHOD FOR MANUFACTURING THE SAME, MODULE, AND WATER TREATMENT METHOD

(71) Applicant: TOYOBO CO., LTD., Osaka-shi, Osaka (JP)

(72) Inventors: Michiko Shimizu, Otsu (JP); Toshiyuki Yagi, Otsu (JP); Shinobu Tokimi, Otsu (JP)

(73) Assignee: TOYOBO CO., LTD., Osaka-shi (JP)

( * ) Notice: Subject to any disclaimer, the term of this patent is extended or adjusted under 35 U.S.C. 154(b) by 0 days.

(21) Appl. No.: 14/371,704

(22) PCT Filed: Feb. 22, 2013

(86) PCT No.: PCT/JP2013/054515
§ 371 (c)(1),
(2) Date: Jul. 10, 2014

(87) PCT Pub. No.: WO2013/125681
PCT Pub. Date: Aug. 29, 2013

(65) Prior Publication Data
US 2015/0008185 A1 Jan. 8, 2015

(30) Foreign Application Priority Data
Feb. 24, 2012 (JP) .................................. 2012-038688

(51) Int. Cl.
*B01D 61/08* (2006.01)
*B01D 69/02* (2006.01)
(Continued)

(52) U.S. Cl.
CPC ........... *B01D 69/081* (2013.01); *B01D 61/08* (2013.01); *B01D 69/02* (2013.01); *B01D 69/08* (2013.01);
(Continued)

(58) Field of Classification Search
CPC .............................. B01D 69/081; B01D 71/16
See application file for complete search history.

(56) References Cited

U.S. PATENT DOCUMENTS 4,239,545 A 12/1980 Uemura et al.
4,371,487 A 2/1983 Hamada et al.
(Continued)

FOREIGN PATENT DOCUMENTS

EP 2 586 518 A1 5/2013
GB 2000722 A * 1/1979 ........... B01D 67/003
(Continued)

OTHER PUBLICATIONS

International Search Report, dated Apr. 16, 2013, issued in application No. PCT/JP2013/053014. (2 pages).
(Continued)

*Primary Examiner* — Krishnan S Menon
*Assistant Examiner* — Ryan B Huang
(74) *Attorney, Agent, or Firm* — Westerman, Hattori, Daniels & Adrian, LLP

(57) ABSTRACT

A hollow fiber type semipermeable membrane which achieves both water permeability and selectivity in high level and performs efficient treatment using small membrane area utilizing the concentration difference from high concentration liquid having high osmotic pressure. The hollow fiber type semipermeable membrane is characterized in that, when an aqueous solution of 25° C. having NaCl concentration of 35 g/L and pressure of 1.0 MPa is flown into an outer side of the hollow fiber type semipermeable membrane having length of about 70 cm while freshwater of 25° C. having NaCl concentration of 0 g/L is flown into an inner side of one open end of the hollow fiber type semipermeable membrane and discharged from another open end at 10 kPa or less, the permeation flow rate is 30 to 70 L/m²/day. An
(Continued)

inner diameter thereof is 50 to 200 µm; and the hollow ratio thereof is 24 to 42%.

7 Claims, 1 Drawing Sheet

(51) Int. Cl.
*B01D 69/08* (2006.01)
*B01D 71/16* (2006.01)
*B01D 71/74* (2006.01)
*C02F 1/44* (2006.01)
*C02F 103/08* (2006.01)
*B01D 61/00* (2006.01)

(52) U.S. Cl.
CPC ............ *B01D 69/087* (2013.01); *B01D 71/16* (2013.01); *B01D 71/74* (2013.01); *C02F 1/441* (2013.01); *B01D 61/002* (2013.01); *B01D 2323/14* (2013.01); *B01D 2325/04* (2013.01); *B01D 2325/20* (2013.01); *C02F 2103/08* (2013.01); *C02F 2301/066* (2013.01)

(56) References Cited

U.S. PATENT DOCUMENTS

| | | | |
|---|---|---|---|
| 4,459,210 A * | 7/1984 | Murakami | A61L 33/062 210/500.23 |
| 4,780,205 A * | 10/1988 | Murakami | B01D 67/0088 210/321.8 |
| 4,781,834 A | 11/1988 | Sekino et al. | |
| 4,980,063 A | 12/1990 | Mahoney et al. | |
| 5,011,637 A * | 4/1991 | Overman, III | B01D 71/16 264/200 |
| 5,131,928 A | 7/1992 | Blackman et al. | |
| 5,624,561 A * | 4/1997 | Uenishi | B01D 69/08 210/321.71 |
| 8,915,378 B2 | 12/2014 | Tokimi et al. | |
| 2006/0016754 A1 | 1/2006 | Ito et al. | |
| 2006/0226067 A1 | 10/2006 | Herron | |
| 2010/0108599 A1 | 5/2010 | Vizvardi et al. | |
| 2010/0219122 A1 | 9/2010 | Ogawa | |
| 2011/0062074 A1* | 3/2011 | Ishibashi | B01D 61/18 210/321.87 |
| 2011/0316181 A1 | 12/2011 | Liu et al. | |
| 2012/0043274 A1 | 2/2012 | Chi et al. | |
| 2012/0074064 A1 | 3/2012 | Krause et al. | |

FOREIGN PATENT DOCUMENTS

| | | | |
|---|---|---|---|
| JP | 55-152501 A | 11/1980 | |
| JP | 59-036715 A | 2/1984 | |
| JP | 59-042008 A | 3/1984 | |
| JP | 09-019630 A | 1/1997 | |
| JP | 10-337448 A | 12/1998 | |
| JP | 2000-334275 A | 12/2000 | |
| JP | 2003-290632 A | 10/2003 | |
| JP | 2004-082020 A | 3/2004 | |
| JP | 2008-132441 A | 6/2008 | |
| JP | 2011-212638 A | 10/2011 | |
| WO | 2009/051168 A1 | 4/2009 | |
| WO | 2010/144057 A1 | 12/2010 | |
| WO | 2011/028541 A2 | 3/2011 | |
| WO | 2011/136465 A2 | 11/2011 | |
| WO | 2011/155338 A1 | 12/2011 | |
| WO | 2012/002263 A1 | 1/2012 | |
| WO | 2012/026373 A1 | 3/2012 | |

OTHER PUBLICATIONS

Extended European Search Report dated Jul. 29, 2015, issued in European Patent Application No. 13746612.4 (7 pages).
Non-Final Office Action dated Dec. 9, 2015, issued in U.S. Appl. No. 14/362,187, (16 pages).
International Search Report dated Nov. 1, 2011, issued in application No. PCT/JP2011/068612. (2 pages).
Notification of Transmittal of Translation of the International Preliminary Report on Patentabililty (Form PCT/IB/338) of International Application No. PCT/JP2011/068612 dated Mar. 28, 2013 with Forms PCT/IB/373 and PCT/ISA/237. (5 pages).
Non-Final Office Action dated Jun. 19, 2014, issued in U.S. Appl. No. 13/805,227, (16 pages).
Notice of Allowance dated Oct. 29, 2014, issued in U.S. Appl. No. 13/805,227, (7 pages).
Extended European Search Report dated Jul. 29, 2015, issued in counterpart European Patent Application No. 13751153.1 (9 pages).
International Search Report dated May 14, 2013, issued in corresponding application No. PCT/JP2013/054515.
Hagiwara, Bunji, et al., "separation methods using membranes", Kodansha Ltd., Japan, Aug. 1, 2014, 8th Print, pp. 35-39, cited in ISR, w/English summary.
Final Office Action dated May 2, 2016, issued in U.S. Appl. No. 14/362,187. (13 pages).
Non-Final Office Action dated Jan. 20, 2017, issued in U.S. Appl. No. 14/362,187 (9 pages).
Office Action dated Jan. 17, 2017, issued in counterpart Japanese Patent Application No. 2014-500949, with English translation. (13 pages).
Hagiwara, Bunji, et al., "separation methods using membranes", Koudansha Ltd., Japan, Aug. 1, 1989, 8th Print, pp. 34-39, cited in the Japanese Office Action dated Jan. 17, 2017, w/English summary.
Final Office Action dated Jul. 6, 2017, issued in U.S. Appl. No. 14/362,187. (16 pages).
Final Office Action dated Jan. 9, 2018, issued in U.S. Appl. No. 14/362,187. (20 pages).
Non-Final Office Action dated Nov. 5, 2018, issued in U.S. Appl. No. 14/362,187. 9 pages.

* cited by examiner

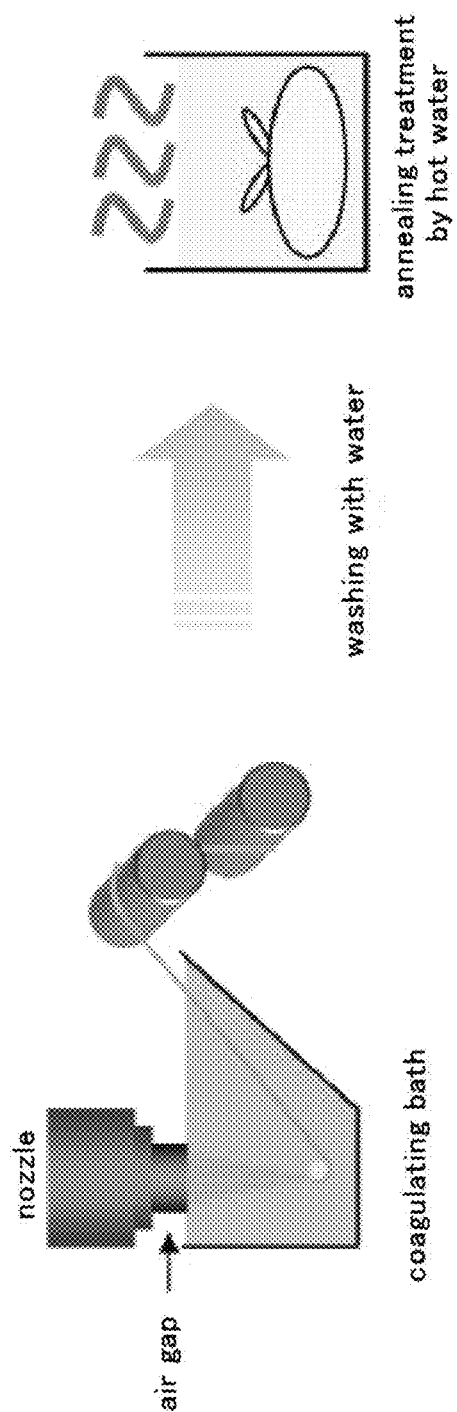

HOLLOW FIBER TYPE SEMIPERMEABLE MEMBRANE, METHOD FOR MANUFACTURING THE SAME, MODULE, AND WATER TREATMENT METHOD

TECHNICAL FIELD OF THE INVENTION

The present invention relates to a hollow fiber type semipermeable membrane which can maintain both water permeability and separating property in high level, reduce a space for installment and enhance the treating efficiency. It also relates to a method for manufacturing the same, to a module and to a water treatment method. More specifically, it relates to the concentration/recovery of valuables, or to the reduction in volume by means of concentration of waste water, or to the generation of energy wherein freshwater is permeated from aqueous solution of low concentration to aqueous solution of high concentration in pressurized state utilizing the difference in the concentrations as driving force and a turbine, etc. is rotated by the pressure and the flow rate of the aqueous solution in a pressurized state which are increased by the permeated freshwater. More particularly, the present invention relates to a hollow fiber type semipermeable membrane which is advantageously used for water treatment, etc. for generation of energy such as electric power utilizing the difference in concentrations between seawater or concentrated seawater and freshwater.

BACKGROUND ART

Separation/concentration of liquid mixtures by a membrane separation method is an energy-saving method as compared with a separation technique such as distillation because it is not accompanied with phase change. Also, it does not cause the phase changes in the state of substances. Therefore, it has been widely utilized in many fields including a food field such as concentration of fruit juice and separation of beer enzyme; and recovery of organic substances from industrial wastewater. Treatment of water by a semipermeable membrane has become firmly established as an indispensable process supporting the most leading-edge technology.

For example, generation of energy by means of pressure and flow rate achieved by utilizing the difference in concentrations between seawater and freshwater with a semipermeable membrane is a clean process and has been expected as a recyclable energy. Particularly due to the fact that a hollow fiber type semipermeable membrane can make the membrane area per membrane module volume large in spite of its small permeation flow rate per unit membrane area as compared with a spiral wound type semipermeable membrane, it has advantages that the permeation flow rate can be made large as a whole and that volume efficiency is very high whereby it has excellent compactness. Further, when both aqueous solution of high concentration and freshwater are fed into a module and made to contact with each other via a hollow fiber type semipermeable membrane, concentration polarization on the membrane surface can be made small.

Generally, such hollow fiber type semipermeable membrane is manufactured in such a method that a dope containing cellulose acetate is prepared as a polymer material, extruded from a nozzle into air, coagulated in a coagulating solution, washed and shrunk by annealing by hot water. As to a semipermeable membrane for keeping both water permeability and separating property in high level, those mentioned in Patent Documents 1 and 2 are exemplified.

Patent Document 1 discloses an art concerning a hollow fiber type semipermeable membrane module utilized for separation of solid or separation of solute from a liquid mixture. However, according to the properties of the hollow fiber membrane using cellulose triacetate shown in Table 1 of Patent Document 1, the permeation flow rate (FR1) measured under operating pressure of 55 kg/cm$^2$ is 22.6 to 91.5 l/(m$^2$·day) whereby no high water permeability can be achieved. In addition, water permeability utilizing the concentration difference as a driving force is not disclosed. Moreover, the membrane mentioned in said document has been treated at a high annealing temperature whereby the membrane structure thereof is densified and it is not suitable for membrane separation utilizing the concentration difference as a driving force. Particularly when it is used for generation of energy under such a condition that the high concentration side is in a pressurized state, the effective pressure difference [(osmotic pressure difference)−(pressure at high concentration side)] wherein the concentration difference is a driving force becomes the result of subtraction of the pressure at high concentration side in the pressurized state from the osmotic pressure difference whereby the permeation flow rate becomes low. Further, since the membrane is used in the pressurized state, the pressure resistance corresponding to said pressurized condition is necessary.

Patent Document 2 discloses an art concerning a flat sheet type composite semipermeable membrane which is equipped, on a microporous support, with an active layer (thin membrane, skin layer) containing interfacial polymerized polyamide as a main component and which has both high salt rejection rate and high water permeability when pressure is utilized as a driving force. According to the description of Example 1, the semipermeable membrane disclosed in the Patent Document 2 has permeation flow rate of 1.0 m$^3$/m$^2$·day (1000 L/m$^2$·day) when measured under an operation pressure of 7.5 kg/cm$^2$. However, this semipermeable membrane is in a form of flat membrane whereby, when it is used for the actual water treatment wherein the concentration difference via semipermeable membrane is utilized as a driving force, it is difficult that aqueous solution of high concentration and aqueous solution of low concentration (freshwater) to be fed are effectively and uniformly partitioned to the surface of the membrane. In addition, in the area to which small flow rate of the aqueous solution is fed, concentration polarization on the membrane surface becomes particularly high. Accordingly, it is difficult to ensure the effective concentration difference whereby there is a disadvantage that efficiency of the water treatment cannot be made high. Moreover, in the membrane comprising such a polyamide material, there are disadvantages that it is inferior in its resistance to chlorine and that usable bactericidal chemicals are limited.

On the other hand, there has been a brisk demand from the consumers paying their importance to economy and compactness of a water treatment membrane plant for improving the treating ability per membrane area in a hollow fiber type semipermeable membrane. In the case of water treatment wherein the concentration difference is utilized as a driving force without application of high pressure, no high water permeability is achieved even if the conventional semipermeable membrane for lower pressure is used. As a result, it is the present situation that water production cost and installation space cannot be suppressed.

As mentioned hereinabove, it is the present situation that there is no hollow fiber type semipermeable membrane which can achieve both water permeability and selectivity in high level and which can perform efficient water treatment utilizing the concentration difference as a driving force, in a small installation space.

PRIOR ART DOCUMENTS

Patent Documents

Patent Document 1: Japanese Patent Application Laid-Open (JP-A) No. 337448/98
Patent Document 2: Japanese Patent Application Laid-Open (JP-A) No. 19630/97

DISCLOSURE OF THE INVENTION

Problem that the Invention is to Solve

The present invention has been created in view of the above-mentioned present situation of the prior art. An object of the present invention is to provide a hollow fiber type semipermeable membrane which achieves both water permeability and selectivity in high level and which can perform efficient treatment using small membrane area and small installation space in such a water treatment for generating energy wherein, for example, liquids in different concentrations are made to contact via the semipermeable membrane, water at low concentration side is permeated through the semipermeable membrane utilizing the concentration difference between them as a driving force, and turbine is rotated by means of the pressure and the total flow rate of a liquid at high concentration side in a pressurized state and of permeated water whereby energy is generated. Another object of the present invention is to provide a method for manufacturing the same. When a liquid at high concentration side is used in a pressurized state, the semipermeable membrane needs to have a pressure resistance corresponding to the pressurized condition. The hollow fiber type semipermeable membrane of the present invention is particularly suitable for a water treatment wherein energy is generated, for example, by rotation of turbine by means of water which has been permeated through the semipermeable membrane, utilizing the concentration difference between water having high salt concentration and being in pressurized state (such as seawater and concentrated seawater) and freshwater as a driving force.

Means for Solving the Problem

The present inventors have earnestly investigated for achieving the object as such and, as a result, they have found that, when a dense layer playing a role of selecting function between salt and water in a hollow fiber type semipermeable membrane is made thinner than the conventional one and a support layer having highly-communicative connection structure is adopted, it is possible to promote diffusion in the support layer and to suppress concentration polarization in the support layer whereby water permeability can be achieved in high level utilizing the concentration difference as a driving force whereupon the present invention has been accomplished.

Thus, the present invention has the following constitutions (1) to (5).

(1) A hollow fiber type semipermeable membrane which is characterized in that, when an aqueous solution of 25° C. having sodium chloride concentration of 35 g/L and pressure of 1.0 MPa is flown into an outer side of the hollow fiber type semipermeable membrane having length of about 70 cm while freshwater of 25° C. having sodium chloride concentration of 0 g/L is flown into an inner side of one open end of the hollow fiber type semipermeable membrane and discharged from another open end at 10 kPa or less, the permeation flow rate is 30 to 70 $L/m^2/day$, wherein said permeation flow rate is measured under such a condition that twice of the permeation flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the inner side of the hollow fiber type semipermeable membrane is equal to 10% of said permeation flow rate; the hollow fiber type semipermeable membrane is further characterized in that, when aqueous solution having sodium chloride concentration of 1.5 g/L is filtered from the outer side to the inner side of the hollow fiber type semipermeable membrane at 25° C. and under pressure of 3.0 MPa, the ratio (permeation flow rate ratio) of the value of permeation flow rate after 24 hours to the value thereof after 1 hour is 0.85 to 1.0; that the outer diameter of the hollow fiber type semipermeable membrane is 100 to 280 μm; that the inner diameter thereof is 50 to 200 μm; and that the hollow ratio thereof is 24 to 42%.

(2) A method for manufacturing the hollow fiber type semipermeable membrane mentioned in (1), comprising the steps of: discharging a dope into a coagulating liquid from a nozzle via an air gap to coagulate followed by washing; and treating the resulting hollow fiber type semipermeable membrane by dipping into water of 40 to 80° C. and further treating by dipping into water of 85 to 99.5° C.

(3) A hollow fiber type semipermeable membrane module, characterized in that, the hollow fiber type semipermeable membrane mentioned in (1) is incorporated therein.

(4) A water treatment method comprising the steps of: introducing an aqueous solution having high concentration into the hollow fiber type semipermeable membrane module mentioned in (3); contacting the aqueous solution having high concentration with an aqueous solution having low concentration via the hollow fiber type semipermeable membrane; and taking out freshwater from the aqueous solution having low concentration.

(5) The method for the water treatment according to (4), wherein the pressure of the aqueous solution having high concentration at the outlet of the module is 0.5 to 3.0 MPa.

Advantages of the Invention

In the hollow fiber type semipermeable membrane of the present invention, thickness of the dense layer is made thin and communicative connection property of the support layer part is enhanced as compared with the conventional semipermeable membrane for high pressure. Accordingly, the permeated water can be effectively obtained in a water treatment wherein the difference in salt concentrations of solutions contacting via the membrane is utilized as a driving force.

BRIEF DESCRIPTION OF THE DRAWINGS

FIG. 1 is an explanatory drawing of the steps for the manufacture of the semipermeable membrane of the present invention.

BEST MODE FOR CARRYING OUT THE INVENTION

Up to now, development of hollow fiber type semipermeable membrane (particularly semipermeable membrane having high selectivity between salt and water) has been conducted in such a direction that the main purpose is to make the membrane structure (particularly separation active layer (dense layer) on the surface thereof) dense and that, basically, polymer concentration in the dope is made high and the membrane after its preparation is subjected to an annealing treatment by hot water of high temperature so that the membrane structure is made further dense. Such a means is rational in view of imparting the durability in the case of the use under a pressurized state of high pressure (e.g. 5 MPa or more) and in view of high selectivity, and is appropriate as an aim for the development of what we call reverse osmosis membrane wherein seawater is fed in high pressure and filtered with a semipermeable membrane for desalination. However, when the means is used for a semipermeable membrane for the water treatment wherein the concentration difference between liquids via the semipermeable membrane (osmotic pressure difference) is utilized as a driving force without applying high pressure to feed water, only such a product having a small permeation flow rate is produced due to the treatment under a low effective pressure difference [(osmotic pressure difference)–(pressure at high concentration side)]. Further, in order to effectively ensure the concentration difference via the membrane, the important thing is not only the structure of a dense layer which is a separation active layer but also the structure of a support layer connecting to the dense layer.

In order to express high water permeability even when the concentration difference is utilized as a driving force while maintaining both high selectivity between salt and water and high water permeability, the present inventors have conducted an improvement in the membrane structure by taking a new conception for membrane design which sloughs off the conventional way for the development of semipermeable membrane. Thus, we thought that the balance between selectivity for water and salt, and the water permeability can be enhanced when the selective functional layer (dense layer) is made thinner and more dense than a conventional semipermeable membrane wherein the treatment is conducted by feed water at medium to high pressure and, at the same time, concentration polarization can be reduced on the support layer and effective concentration difference can be ensured when the support layer is provided with highly-communicative connection structure so as to promote diffusion in the support layer. Further, with regard to the design of a membrane module which achieves the maximum performance while sufficient durability is still maintained, the present inventors paid their attention to optimization of outer diameter and hollow ratio of the hollow fiber type semipermeable membrane based on the relation between the fluid pressure loss of a fluid running the bore and the membrane area per volume of module. The present invention has been achieved after repetition of trials and errors for actualization of the technical idea as such.

The semipermeable membrane of the present invention is hollow fiber type, and preferably adopts cellulose acetate as a raw material. Cellulose acetate is resistant to chlorine which is a bactericide and can easily suppress the growth of microbes. Accordingly, it has a feature that the pollution with microbes on the membrane can be effectively suppressed. Among the cellulose acetate, cellulose triacetate is preferred in view of durability. In the hollow fiber type membrane, membrane area per each module can be made large as compared with the spiral wound type membrane and, in the case of a module nearly in the same size, a membrane area of about ten-fold of that of the spiral wound type can be achieved, though it may vary depending on size of the hollow fiber type semipermeable membrane. Accordingly, in the hollow fiber type membrane, a treating amount per unit membrane area may be very small for obtaining the same permeation flow rate whereby stain on the membrane (which causes from permeation of feed water through the membrane) can be reduced and operating time until washing of the membrane can be made long.

In the semipermeable membrane of the present invention, when an aqueous solution of low concentration and an aqueous solution of high concentration are made to contact via the membrane, water is permeated from the low concentration side to the high concentration side utilizing the difference in concentrations of the solutions as a driving force whereupon an aqueous solution in a pressurized state is obtained. Although there is no particular limitation for a method of generating the energy using the resulting aqueous solution in a pressurized state, an example thereof is a method wherein turbine is rotated by water flow such as by means of a water flow generator and said rotation is converted to electric power using a generator. Therefore, the high concentration side is kept in a pressurized state for rotating the turbine. This pressure is set at lower than the osmotic pressure difference or, usually, about one half of the osmotic pressure. This concentration difference (osmotic pressure difference) is a driving force by which freshwater permeates the membrane and is a value after deducting the pressurization pressure for keeping the pressurized state. As to the salt concentration of an aqueous solution of high concentration, seawater which is widely present in general is a representative one and, since it is about 3.5% to 7% when seawater in a high salt concentration region is included, the pressurization pressure is appropriate to be within a range of about 0.5 to 3 MPa. On the other hand, an aqueous solution of low concentration is such a one wherein salt concentration is not more than one-tenth of common seawater which is a representative aqueous solution of high concentration and it is not more than 3500 mg/L and not more than 0.3 MPa in terms of TDS (total dissolved solids) and osmotic pressure, respectively. Examples thereof include river water, lake water, tap water, industrial water and treated waste water.

Semipermeable membrane is usually classified according to the operation pressure. The membrane for high pressure used at an operation pressure of 5 to 8 MPa has a very dense structure since it is used for desalination of seawater and is to be resistant to the pressure which is higher than the osmotic pressure of seawater. On the contrary, in the semipermeable membrane of the present invention, water is permeated utilizing the concentration difference as a driving force and the membrane is used at an operation pressure of 3 MPa or lower which is lower than osmotic pressure of solution of high concentration side such as seawater. In the conventional membrane for high pressure, the membrane has a relatively dense structure as a whole for imparting the resistance to pressure whereby, if the effective pressure difference is lowered, the permeation flow rate lowers in proportion to the pressure. When the structure of the whole membrane is made rough for enhancing the permeation flow rate, a salt-inhibiting property lowers. Further, in the conventional membrane for lower pressure, it does not have a structure capable of achieving a high permeation flow rate due to the fact that it has been developed on the basis of membranes for medium to high pressure. In the semipermeable membrane of the present invention, it is possible to achieve water permeability and selectivity in high level even when effective pressure difference is low. Further, it is possible to achieve high level of water permeability when water is permeated through the membrane utilizing the concentration difference as a driving force. The semipermeable membrane of the present invention is based on a design idea which has not been proposed before.

The hollow fiber type semipermeable membrane of the present invention is characterized in that when an aqueous solution of 25° C. having sodium chloride concentration of 35 g/L and pressure of 1.0 MPa is flown into an outer side of the hollow fiber type semipermeable membrane having length of about 70 cm while freshwater of 25° C. having sodium chloride concentration of 0 g/L is flown into an inner side of one open end of the hollow fiber type semipermeable membrane and discharged from another open end at 10 kPa or less, the permeation flow rate per membrane area is 30 to 70 $L/m^2/day$, wherein said permeation flow rate is measured under such a condition that twice of the permeation flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the inner side of the hollow fiber type semipermeable membrane is equal to 10% of said permeation flow rate. The reason why the sodium chloride concentration is made 35 g/L is to utilize the concentration difference between seawater which is abundantly present in nature and freshwater. Preferably, the sodium chloride concentration is in the range of 34.5 g/L to 35.4 g/L. The reason why the concentration of sodium chloride at the freshwater side is made 0 g/L is that the freshwater of low osmotic pressure which is easily available in nature is expected and it means 200 mg/L or lower. The expression reading that the pressure is 1.0 MPa stands for the range of 0.95 to 1.04 MPa. Although the outlet pressure of the freshwater side means the substantial atmospheric pressure, it is made 10 kPa or lower taking the practically occurring pressure loss, etc. into consideration. The reason for setting at this value is that it is the pressure region wherein energy is most efficiently generated from the flow rate and the pressure achieved by the difference in the concentrations between seawater and freshwater. In addition, since the permeation flow rate obtained by utilizing the concentration difference as a driving force is affected by the salt concentration on membrane surface and the concentration polarization, the condition stipulating the value of the permeation flow rate is set, by taking the practice into consideration, to such a condition that twice of the permeation flow rate is equal to a flow rate flown out to the outer side of the hollow fiber type semipermeable membrane and that the flow rate discharged from the other opening end of the hollow fiber type semipermeable membrane is equal to 10% of the permeation flow rate. 10% stands for the range of 9.5% to 10.4%. Further, since the flow rate in the inner side of the hollow fiber type semipermeable membrane and the pressure loss varies dependent upon the length of the hollow fiber type semipermeable membrane, length of the hollow fiber type semipermeable membrane is stipulated as about 70 cm when stipulating the permeation flow rate. With regard to the permeation flow rate, it is preferred to be high for decreasing the necessary membrane area and for increasing the treating amount. In view of competitiveness to the conventional hollow fiber type and spiral wound type ones, it is more preferably 40 $L/m^2/day$ or more, and further preferably 50 $L/m^2/day$ or more. Although there will be no problem even when the permeation flow rate is too high, its upper limit is less than 70 $L/m^2/day$ and more preferably less than 60 $L/m^2/day$ in view of a balance with selectivity to be achieved.

The permeation flow rate by the concentration difference generally tends to high in such a membrane wherein the permeation flow rate due to the pressure difference is high. It is probably due to the fact that the fluidity resistance when water is permeated in the inner area of the membrane. However, in such a case wherein the salt rejection property is not sufficiently high or wherein concentration polarization on the membrane surface having a separating function is big, the effective concentration difference via the membrane lowers whereby, even when the permeation flow rate by the pressure is high, the permeation flow rate due to the concentration difference may become low. When water is permeated utilizing the concentration difference as a driving force, the direction for water permeation can be from the outer side to the inner side or from the inner side to the outer side of the hollow fiber type semipermeable membrane. It is possible to appropriately determine the direction for water permeation by taking the concentration and the characteristic of solute in the high-concentration solution, the flow rate level, etc. into consideration.

The semipermeable membrane of the present invention is designed so as to express the highest performance when it is used for water treatment wherein the concentration difference is utilized as a driving force, but it also exhibits an excellent selective permeability even when it is used for water treatment utilizing a relatively low pressure difference as a driving force. Thus, it is possible to express the permeation flow rate of 90 to 240 $L/m^2/day$ and the salt rejection rate of 98.5 to 99.9%, when an aqueous solution having sodium chloride concentration of 1.5 g/L is filtered from the outer side to the inner side of the hollow fiber type semipermeable membrane at 25° C. and 1.5 MPa pressure. The reason why the value when filtration is done at the pressure of 1.5 PMa is stipulated is that the semipermeable membrane of the present invention is expected to be used at low operation pressure. With regard to the permeation flow rate, it is better to be high for achieving a reduction in installing space upon the water treatment and an increase in the treating amount and, in view of the advantage in compactness as compared with the conventional hollow fiber type and spiral wound type, it is 100 $L/m^2/day$ or more and preferably 130 $L/m^2/day$ or more. Although there is no problem even when the permeation flow rate is too high, its upper limit is 240 $L/m^2/day$ in view of the balance to the salt rejection rate to be achieved. The salt rejection rate is to be considered in view of the balance to the permeation flow rate to be achieved and is 98.5 to 99.9%, preferably 98.8 to 99.9%, and more preferably 99.0 to 99.9%.

The semipermeable membrane of the present invention has a dense layer near the outer surface. Thickness of said dense layer is preferred to be 0.1 to 7 μm. The thickness of the dense layer (which is a substantially separation active layer) is preferred to be thin since the resistance to water permeation becomes low by that and, more preferably, it is 6 μm or less, and most preferably, it is 5 μm or less. However, when the thickness of the dense layer is too thin, latent deficiency in the membrane structure is apt to be revealed and there may occur problems such as that leakage of univalent ion becomes difficult or that securing the durability of the membrane decreases. Accordingly, thickness of the dense layer is more preferred to be 0.5 μm or more, and is most preferred to be 1 μm or more.

In the semipermeable membrane of the present invention, water is permeated, via the membrane, from an aqueous solution of low concentration to an aqueous solution of high concentration in a pressurized state utilizing the concentration difference as a driving force. Accordingly, unlike the conventional high-pressure type semipermeable membrane, it does not need high resistance to pressure. However, it needs resistance to pressure to some extent for a long-term stable use. In general, in a semipermeable membrane comprising a polymer, densification of the membrane is resulted under a pressurized state and water permeability lowers. Such a change with elapse of time is generally approximated by negative exponential function of time and, although the changing rate in the initial operation is big, it stabilizes with elapse of time. Accordingly, the changing rate of the water permeability in the initial operation can be used as an estimated index for a long-term stability of the property. For example, ratio of permeation flow rate expressed by the ratio of the permeation flow rate after 24 hours to the permeation flow rate in the initial stage (after 1 hour) is a property retention rate showing the pressure resistance, and it is preferred to be 0.85 or more, more preferred to be 0.9 or more, and further preferred to be 0.95 or more. Further, the evaluating pressure of this pressure resistance is set at 3 MPa by considering the actual operating condition (0.5 to 3 MPa), wherein the pressurized state for rotating the turbine and this pressure is less than the osmotic pressure difference resulted by the concentration difference and is usually set at about one half of the osmotic pressure. As to the salt concentration of the high concentration side, that of seawater which is widely present is usually a representative one. When seawater in the high salt concentration area is included into consideration, it is about 3.5 to 7%. Therefore, when its osmotic pressure (3 to 6 MPa) is taken into consideration, the highest value of the pressurizing pressure under the operating condition is about 3 MPa, and it is practical to secure the pressure resistance and the durability of about 3 MPa.

Inner diameter of the semipermeable membrane of the present invention is 50 to 200 μm, preferably 65 to 190 μm, and more preferably 75 to 160 μm. When the inner diameter is smaller than the above range, the pressure loss of the fluid flowing through the bore usually becomes large whereby pressure required for flowing desired flow rate of freshwater becomes extremely high when length of the hollow fiber type semipermeable membrane is relatively long, which causes loss of energy. On the other hand, when the inner diameter is larger than the above range, trade-off between the hollow ratio and the module membrane area happens whereby it is necessary to sacrifice any of the durability at the used pressure and the membrane area per unit volume.

Outer diameter of the semipermeable membrane of the present invention is 100 to 280 μm, preferably 115 to 270 μm, and more preferably 130 to 250 μm. When the outer diameter is smaller than the above range, the inner diameter inevitably becomes small whereby the same problem as in the case of the above inner diameter is resulted. On the other hand, when the outer diameter is larger than the above range, it is not possible to increase the membrane area per unit volume in the module whereby deteriorating the compactness which is one of the advantages of the hollow fiber type semipermeable membrane module.

Hollow ratio of the semipermeable membrane of the present invention is 24 to 42%, preferably 25 to 40%, and more preferably 26 to 38%. When the hollow ratio is smaller than the above range, membrane resistance becomes large and no desired permeation flow rate may be achieved. When the hollow ratio is larger than the above range, no sufficient pressure resistance may be secured even in the use at low pressure.

The hollow ratio (%) can be determined by the following formula:

$$\text{hollow ratio (\%)} = [(\text{inner diameter})/(\text{outer diameter})]^2 \times 100$$

Length of the semipermeable membrane of the present invention is 15 to 500 cm, preferably 20 to 400 cm, more preferably 25 to 300 cm. This length is the possible range which is generally used in a hollow fiber type semipermeable membrane module. However, if the length is out of the above range, it may be difficult to achieve both water permeability and salt rejection rate at a low operating cost.

Now an example of a method for the manufacture of a semipermeable membrane of the present invention will be illustrated. As shown FIG. 1, the semipermeable membrane of the present invention is manufactured by extruding a dope from a nozzle to a coagulating bath via an air gap to manufacture a hollow fiber type semipermeable membrane; by washing the resulting hollow fiber type semipermeable membrane with water; and by subjecting the hollow fiber type semipermeable membrane to an annealing treatment by hot water to shrink the membrane. The method of manufacturing the semipermeable membrane of the present invention is characterized in that the annealing treatment by hot water is carried out to the semipermeable membrane after the membrane formation in two steps so as to enhance the communicative connection property of a support layer in the membrane. As a result of adopting the annealing treatment by hot water as such, the communicative connection property of a support layer after the annealing treatment by hot water is improved as compared with the case wherein an annealing treatment by hot water is conducted in one step. When an annealing treatment by hot water of low temperature is conducted for one time at not higher than the glass transition temperature before conducting an annealing treatment by hot water of high temperature, the solvent remained in the hollow fiber type semipermeable membrane after the membrane formation is highly removed without re-dissolving the membrane structure whereby it is possible to maintain a membrane structure having a high communicative connection structure. As a result of an annealing treatment by hot water of high temperature in the latter stage, it is possible to enhance the fixation and the dimensional stability of the membrane structure and also to enhance the thermal stability. When an annealing treatment is conducted by hot water of high temperature in one step, it is likely that the membrane structure is destroyed by re-dissolution due to the affection of the residual solvent and that the membrane structure having a high communicative connection structure may be destroyed. Thus, in the hollow fiber type semipermeable resin of the present invention, the communicative connection property of a support layer becomes high and the closing pores become less than those in a support layer structure of a semipermeable membrane according to the conventional treating method whereby, as a result, it is likely that tortuosity also becomes small and that diffusion of a solute is apt to take place.

The dope to be used contains cellulose acetate (membrane material), solvent and nonsolvent and, if necessary, organic acid and/or organic amine are/is added thereto. As to the cellulose acetate, it is preferred to use cellulose triacetate. As to the solvent, it is preferred to use one or more member(s) selected from the group consisting of N, N-dimethylformamide, N, N-dimethylacetamide, N-methyl-2-pyrrolidone and N,N-dimethyl sulfoxide. More preferred one is N-methyl-2-pyrrolidone. As to the nonsolvent, it is preferred to use one or more member (s) selected from the group consisting of ethylene glycol, diethylene glycol, triethylene glycol and polyethylene glycol. More preferred one is ethylene glycol. As to the organic acid, it is preferred to use amino acid, aromatic carboxylic acid, hydroxy acid, alkoxy acid, dibasic acid or hydroxy monoester thereof. More preferred ones are phthalic acid, tartaric acid, ε-amino-n-caproic acid, benzoic acid, 4-methylaminobutyric acid, p-oxybenzoic acid and maleic acid and one or more thereof may be used. As to the organic amine, any of primary, secondary and tertiary hydroxyalkylamines may be used. To be more specific, monoethanolamine, triethanolamine, diisopropanolamine and triisopropanolamine are preferred. Triisopropanolamine is more preferred.

Concentration of cellulose acetate in the dope is preferred to be 38 to 45% by weight, more preferred to be 39 to 44% by weight, and further preferred to be 40 to 43% by weight. When the cellulose acetate concentration is lower than the above range, the membrane structure becomes too coarse and no sufficient selectivity and membrane strength may be achieved while, when it is higher than the above range, viscosity of the dope becomes high whereby stability in preparing the membrane may not be achieved or water permeability of the resulting membrane may not be enhanced. The ratio by weight of solvent/nonsolvent in the dope is preferred to be from 60/40 to 95/5. When the ratio by weight of solvent/nonsolvent is lower than the above range, the membrane surface structure does not become dense since evaporation of the solvent does not proceed and, although water permeability does not greatly change, selectivity may become low while, when it is higher than the above range, formation of extremely asymmetric membrane proceeds whereby strength of the membrane may not be achieved.

Then the dope prepared as above is dissolved by heating at 90 to 190° C. and the dissolved dope is extruded from an arc-type nozzle, a C type nozzle or a tube-in-orifice type nozzle heated at 150 to 180° C. When a tube-in-orifice type nozzle is used, it is preferred to use air, nitrogen, carbon dioxide, argon, etc. as a bore-forming material. The extruded dope is passed through the air gap (gaseous atmosphere) for 0.02 to 0.4 second and then dipped in an aqueous coagulating bath to coagulate.

As to a composition of solvent and nonsolvent of the coagulating bath, it is preferred to use the same composition as that used for the dope. As to the composition ratio of a coagulating bath, the ratio by weight of solvent:nonsolvent: water is preferred to be 0 to 15:0 to 8:100 to 77. When the rate of water is too low, phase separation of the membrane proceeds and pore size may become too large. Although the rate of water may be 100%, amount of the waste liquid from the coagulating bath in the continuous membrane manufacture become more.

From the hollow fiber type semipermeable membrane pulled out from the coagulating bath, the remaining solvent, nonsolvent, etc. are removed by washing with water. Examples of the method for washing with water include a multistage inclination gutter method for washing with water where water for washing is flown down in a long inclined gutter and a hollow fiber type semipermeable membrane is dipped in said washing water to conduct the washing with water; a Nelson roller method for washing with water where two long rollers (Nelson rollers) crossing in certain angles are used and hollow fiber type semipermeable membranes are wound in fold upon fold on the rollers wherein the Nelson roller surfaces are always made wet with water for washing and the washing with water is conducted by means of contacting said water for washing to the hollow fiber type semipermeable membranes; a net shower washing method with water where hollow fiber type semipermeable membrane is shaken down onto a net followed by washing with shower water; and a washing with water by dipping where hollow fiber type semipermeable membrane is directly dipped into a washing water in a deep vessel followed by washing with water. In the present invention, any one of methods for washing with water can be used for washing with water.

It is preferred that the hollow fiber type semipermeable membrane subjected to a washing treatment with water is dipped into water under a nontensed state and is subjected to an annealing treatment by hot water at 40 to 80° C. for 5 to 60 minutes, followed by another annealing treatment by hot water at 85 to 99.5° C. As a result of subjecting to an annealing treatment by hot water at a relatively low temperature followed by another annealing treatment by hot water at a relatively high temperature, improvements in fixation and dimensional stability of membrane structure and in thermal stability can be expected while maintaining high communicative connection structure. For such a purpose, the first annealing treatment by hot water adopts the temperature of not higher than the temperature of near the glass transition temperature, and the second annealing treatment by hot water adopts the temperature of higher than the glass transition temperature and lower than the melting point. Specifically, the temperature for the first annealing treatment by hot water is preferred to be within a range of 40 to 80° C., more preferred to be within a range of 45 to 78° C., and further preferred to be within a range of 50 to 75° C. When the temperature is lower than the above range, washing effect of the solvent is small. On the contrary, when the temperature is higher than the above range, communicative connection structure of the membrane structure is destroyed due to the solvent and high temperature. The temperature for the second annealing treatment by hot water is preferred to be 85 to 99.5° C., more preferred to be 87 to 99.3° C., and further preferred to be 90 to 99° C. When the temperature is lower than the above range, densification of the membrane and stabilization of the membrane structure become insufficient. On the contrary, when the temperature is higher than the above range, densification of the membrane proceeds too much to give a membrane structure having low water permeability.

When the temperature for the annealing treatment by hot water is higher than the above range, the membrane structure is destroyed due to re-dissolution of the membrane structure, or densification of the membrane structure proceeds too much whereby the balance between the salt rejection rate and the water permeability may be lost. On the contrary, when it is lower than the above range, remaining solvent cannot be sufficiently removed and the membrane structure is destroyed in the annealing treatment by hot water, or densification of the membrane structure is not sufficient whereby no desired salt rejection rate may be achieved. Time for the annealing treatment by hot water is usually 5 to 60 minutes. When the treating time is too short, no sufficient annealing effect may be achieved even if the annealing treatment by hot water is conducted under the above conditions. In addition, the membrane structure may become non-uniform. When the treating time is too long, not only an increase in manufacturing cost but also too much densification of the membrane may happen whereby no desired balance in the properties may be achieved.

The hollow fiber type semipermeable membrane of the present invention prepared as above is incorporated in a hollow fiber type semipermeable membrane module. Incorporation may be done by the conventionally known method. As disclosed in the post-grant publications of Japanese Patent Nos. 4412486, 4277147, 3591618 and 3008886, an example of the incorporation of the semipermeable membrane is that 45 to 90 hollow fiber type semipermeable membranes are assembled to give a hollow fiber type semipermeable membrane aggregate, a plurality of the resulting hollow fiber type semipermeable membrane aggregates are aligned horizontally and the resulting flat hollow fiber type semipermeable membrane bundle is traversed to a core pipe having many pores to wind around thereon. The winding angle at this time is made 5 to 60° and the winding is done in such a manner that a crossing part is formed on the surface of a specific position of the wound-up body. After that, both ends of this wound-up body are adhered and only one side and/or both sides thereof is/are cut to form a hollow fiber opening(s) whereupon a hollow fiber type semipermeable membrane element is prepared. The resulting hollow fiber type semipermeable membrane element is inserted into a pressure vessel to assemble a hollow fiber type semipermeable membrane module.

The module in which the hollow fiber type semipermeable membrane of the present invention is incorporated is suitable for permeating freshwater into an aqueous solution of high concentration in a pressurized state of 0.5 to 3.0 MPa utilizing the concentration difference as a driving force so as to generate energy utilizing the increased pressurized water amount. Preferred aqueous solution of high concentration includes seawater which is abundantly present in nature, concentrated seawater and artificially prepared aqueous solution of high concentration. With regard to the concentration of aqueous solution in high concentration, it is better to be higher. With regard to its osmotic pressure, it is 0.5 to 10 MPa, preferably 1 to 7 MPa, and more preferably 2 to 6 MPa although it varies depending upon the molecular weight of the solute. The hollow fiber type semipermeable membrane module of the present invention is designed so as to achieve high water permeating property of the membrane and, high permeation flow rate utilizing the concentration difference in salt as a driving force due to the high selectivity for water and salt. Accordingly, it is now possible to efficiently obtain pressurized water utilizing the concentration difference as a driving force.

EXAMPLES

As hereunder, the present invention will be more specifically illustrated by way of Examples although the present invention is not limited to those Examples only. Measurements of the characteristic values measured in the Examples were conducted according to the following methods.

(1) Inner Diameter, Outer Diameter, and Hollow Ratio

Inner diameter, outer diameter and membrane thickness of the hollow fiber type semipermeable membrane were obtained in such a manner that appropriate numbers of hollow fiber type semipermeable membrane are inserted into the pores of 3 mm diameter opened in the center of a slide glass to such an extent that the hollow fiber type semipermeable membranes do not fall therethrough, the hollow fiber type semipermeable membranes are cut using a razor along the upper and lower sides of the slide glass to prepare samples of the hollow fiber type semipermeable membrane sections, and short and long diameters of the resulting sections of hollow fiber type semipermeable membrane are measured using a projector Nikon PROFILE PROJECTOR V-12. For each hollow fiber type semipermeable membrane section, short and long diameters in two directions were measured and an arithmetic mean value of each of them was adopted as inner or outer diameter of one hollow fiber type semipermeable membrane section while the membrane thickness was calculated as [(outer diameter)−(inner diameter)]/2. Similar measurement was conducted for five sections and mean values thereof were adopted as inner diameter, outer diameters and membrane thickness.

Hollow ratio was calculated by the formula [(inner diameter)/(outer diameter)]$^2$×100.

(2) Permeation Flow Rate and Permeation Flow Rate Ratio Due to Pressure Difference After the hollow fiber type semipermeable membranes were bundled and inserted into a sleeve made of plastic, thermosetting resin was injected into the sleeve and hardened to seal. Terminal of the hollow fiber type semipermeable membrane hardened by the thermosetting resin was cut to give an opening of the hollow fiber type semipermeable membrane whereupon there was prepared a module for the evaluation having the membrane area based on the outer diameter of about 0.1 m$^2$. This module for the evaluation was connected to a device for testing the membrane properties comprising a tank for feed water and a pump whereby the properties were evaluated.

A feed aqueous solution having sodium chloride concentration of 1.5 g/L was filtered from outer side to inner side of the hollow fiber type semipermeable membrane at 25° C. and 1.5 MPa pressure and the device was operated for 1 hour. After that, water permeated through the membrane was collected from the opening of the hollow fiber type semipermeable membrane and weight of permeated water was measured by an electron balance (LIBROR EB-3200D manufactured by Shimadzu). The weight of permeated water was converted to amount of permeated water at 25° C. according to the following formula:

amount of permeated water (L)=weight of permeated water (kg)/0.99704 (kg/L)

Permeation flow rate (FR) is calculated by the following formula:

FR [L/m$^2$/day]=amount of the permeated water (L)/ membrane area based on the outer diameter [m$^2$]/collecting time [minutes]×(60 [minutes]× 24 [hours])

Further, the permeation flow rate was measured in a similar way under the above condition except that the operating pressure was changed to 3.0 MPa, and permeation flow rate ratio (ratio to the measured value of the permeation flow rate after 24 hours) as an index for the pressure resistance of the membrane was calculated by the following formula:

permeation flow rate ratio [−]=(permeation flow rate at 3.0 MPa after 24 hours)/(permeation flow rate at 3.0 MPa after 1 hour)

(3) Salt Rejection Rate Due to Pressure Difference

Sodium chloride concentration was measured using a conductometric detector (CM-25R by Toa DKK) from the permeated water collected in the above measurement for permeation flow rate and the feed aqueous solution having sodium chloride concentration of 1,500 mg/L used for the same measurement of permeation flow rate.

Salt rejection rate is calculated by the following formula:

salt rejection rate [%]=(1−salt concentration of permeated water [mg/L]/salt concentration of feed aqueous solution [mg/L])×100

(4) Permeation Flow Rate Due to Concentration Difference (Preparation of Hollow Fiber Type Semipermeable Membrane Element)

These hollow fiber type semipermeable membranes were aligned in a crossing manner around a distribution tube for the feed fluid consisting of porous tube whereupon an aggregate of the hollow fiber type semipermeable membrane was formed. Specifically, the hollow fiber type semipermeable membrane bundle was traversed together with rotating the distribution tube for the feed fluid around its axis so that the bundle was wound around the distribution tube for the feed fluid whereupon the hollow fiber type semipermeable membrane was aligned in a crossing manner. The hollow fiber type semipermeable membrane in the outermost layer was about 41° to the axial direction. Both ends of this aggregate of the hollow fiber type semipermeable membrane were fixed by potting with an epoxy resin and, after that, both ends were cut to open the bore of the hollow fiber type semipermeable membrane whereupon a hollow fiber type semipermeable membrane element was prepared.

(Measurement of Permeation Flow Rate of Module)

The resulting element was installed in the pressure vessel and freshwater having sodium chloride concentration of 200 mg/L or less was fed, using a feed pump, from a port in the ports connecting to each opening of the hollow fiber type semipermeable membrane and the freshwater was flown out from another port. An aqueous solution having sodium chloride concentration of as high as 35 g/L was fed to a distribution tube for the feed fluid connected to the outer side of the hollow fiber type semipermeable membrane using a feed pump, passed the outer side of the hollow fiber type semipermeable membrane and then flown out from a port existing in the side area of the pressure vessel being connected to the outer side of the hollow fiber type semipermeable membrane aggregate and the pressure and the flow rate were adjusted by a flow rate adjusting valve. Flow rate and pressure of each feed pump were adjusted so that permeation flow rate (QDS2−QDS1), pressure and flow rate of module became the following conditions when feed pressure of the aqueous solution in high concentration was PDS1 (MPa), feed flow rate was QDS1 (L/min), discharging water flow rate of the aqueous solution in high concentration was QDS2 (L/min), feed flow rate of freshwater was QFS1 (L/min), flowing-out flow rate of freshwater was QFS2 (L/min) and flowing-out pressure of freshwater was PFS2 (kPa) and then the flow rate increase (QDS2−QDS1) of the aqueous solution in high concentration was measured as the permeation flow rate of module.

PDS1=1.0 MPa
PFS2=10 kPa or less
QDS1/(QDS2−QDS1)=2
QFS2/(QDS2−QDS1)=0.1

Permeation flow rate due to concentration difference (FR) is calculated by the following formula:

FR [L/m$^2$/day]=permeation flow rate of module (L/min)/membrane area based on the outer diameter [m$^2$]×(60 [minutes]×24 [hours])

(5) Thickness of the Dense Layer

After the hollow fiber type semipermeable membrane to be evaluated was washed with water, it was dipped for 1 hour in 2-propanol (Nacalai Tesque) of 25° C. and then dipped for 1 hour in cyclohexane (Nacalai Tesque) of 25° C. to conduct a solvent substitution. Liquid was removed from the hollow fiber type semipermeable membrane after the solvent substitution followed by drying for 24 hours in a vacuum drier (Yamato Vacuum Drying Oven DP41) with inner temperature of 50° C. and inner pressure of −40 Pa.

The resulting dried hollow fiber type semipermeable membrane was embedded in resin and a slice was cut out therefrom using a microtome (REICHERT-NISSEI ULTRA-CUT) so that the hollow fiber type semipermeable membrane section can be observed.

The cut-out slice was observed under a differential interference microscope (Nikon Optiphot stand, reflective differential interference apparatus NR).

From the resulting microscopic image, thicknesses of dense layers in ten places were measured and a mean value thereof was adopted as the thickness of the dense layer.

Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 67 m$^2$ on the basis of outer diameter of the hollow fiber type semipermeable membrane.

Example 2

Cellulose triacetate (CTA, Daicel, LT35) (41% by weight), 52.8% by weight of N-methyl-2-pyrrolidone (NMP, Mitsubishi Chemical), 5.9% by weight of ethylene glycol (EG, Mitsubishi Chemical) and 0.3% by weight of benzoic acid (Nacalai Tesque) were uniformly dissolved at 180° C. to give a dope. Other than that, a hollow fiber type semipermeable membrane was prepared according to the same manner as in Example 1.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 67 $m^2$ on the basis of outer diameter of the hollow fiber type semipermeable membrane.

Example 3

Cellulose triacetate (CTA, Daicel, LT35) (44% by weight), 47.3% by weight of N-methyl-2-pyrrolidone (NMP, Mitsubishi Chemical), 8.4% by weight of ethylene glycol (EG, Mitsubishi Chemical) and 0.3% by weight of benzoic acid (Nacalai Tesque) were uniformly dissolved at 180° C. to give a dope. Other than that, a hollow fiber type semipermeable membrane was prepared according to the same manner as in Example 1. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 67 $m^2$ on the basis of outer diameter of the hollow fiber type semipermeable membrane.

Example 4

A hollow fiber type semipermeable membrane was prepared according to the same manner as in Example 1 except that the hollow fiber type semipermeable membrane has inner diameter of 158 μm, outer diameter of 250 μm and hollow ratio of 40%.

Modules of about 100 cm length for the evaluation were prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 47 $m^2$ on the basis of outer diameter of the hollow fiber type semipermeable membrane.

Example 5

A hollow fiber type semipermeable membrane, prepared according to the same manner as in Example 1, was dipped into water of 80° C. and subjected to an annealing treatment by hot water for 20 minutes. Then, the hollow fiber type semipermeable membrane was dipped into water of 98° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 67 $m^2$ on the basis of outer diameter of the hollow fiber type semipermeable membrane.

Example 6

Cellulose triacetate (CTA, Daicel, LT35) (41% by weight), 41.1% by weight of N-methyl-2-pyrrolidone (NMP, Mitsubishi Chemical), 17.6% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state.

The resulting hollow fiber type semipermeable membrane was dipped into water of 80° C. and subjected to an annealing treatment by hot water for 20 minutes. Then, the hollow fiber type semipermeable membrane was dipped into water of 98° C., subjected to an annealing treatment by hot water for 20 minutes.

The resulting hollow fiber type semipermeable membrane had inner diameter of 86 μm, outer diameter of 175 μm and hollow ratio of 24%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 1. Effective membrane area of this hollow fiber type semipermeable membrane element was about 67 $m^2$ on the basis of outer diameter of the hollow fiber type semipermeable membrane.

Example 7

A hollow fiber type semipermeable membrane, prepared according to the same manner as in Example 1, was dipped into water of 42° C. and subjected to an annealing treatment by hot water for 20 minutes. Then, the hollow fiber type semipermeable membrane was dipped into water of 99° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 m² on the basis of outer diameter of the hollow fiber type semipermeable membrane.

Example 8

A hollow fiber type semipermeable membrane, prepared according to the same manner as in Example 1, was dipped into water of 78° C. and subjected to an annealing treatment by hot water for 20 minutes. Then, the hollow fiber type semipermeable membrane was dipped into water of 87° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 m² on the basis of outer diameter of the hollow fiber type semipermeable membrane.

Example 9

Cellulose triacetate (CTA, Daicel, LT35) (43% by weight), 56.7% by weight of N-methyl-2-pyrrolidone (NMP, Mitsubishi Chemical), and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state.

The resulting hollow fiber type semipermeable membrane was dipped into water of 42° C. and subjected to an annealing treatment by hot water for 20 minutes. Then, the hollow fiber type semipermeable membrane was dipped into water of 85° C., subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 m² on the basis of outer diameter of the hollow fiber type semipermeable membrane.

Example 10

Cellulose triacetate (CTA, Daicel, LT35) (39.7% by weight), 42.0% by weight of N-methyl-2-pyrrolidone (NMP, Mitsubishi Chemical), 17.6% by weight of ethylene glycol (EG, Mitsubishi Chemical), 0.3% by weight of benzoic acid (Nacalai Tesque), and 0.7% by weight of triisopropanolamine (TPA, Nacalai Tesque) were uniformly dissolved at 180° C. to give a dope. The resulting dope was defoamed in vacuo, extruded from an arc-type nozzle (divided into three) at 158° C. into the space which is isolated from the outer air and, after space time of 0.03 second, dipped into a coagulating bath of 12° C. comprising NMP/EG/water in 21.0/9.0/70.0. After that, the hollow fiber type semipermeable membrane was washed by a multistage inclination gutter method and shaken off when the membrane was still in a wet state. The resulting hollow fiber type semipermeable membrane was dipped into water of 80° C. and subjected to an annealing treatment by hot water for 20 minutes. Then, the hollow fiber type semipermeable membrane was dipped into water of 98° C. and subjected to an annealing treatment by hot water for 20 minutes. The resulting hollow fiber type semipermeable membrane had inner diameter of 86 μm, outer diameter of 175 μm and hollow ratio of 24%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 m² on the basis of outer diameter of the hollow fiber type semipermeable membrane.

Example 11

Cellulose triacetate (CTA, Daicel, LT35) (38% by weight), 52.4% by weight of N-methyl-2-pyrrolidone (NMP, Mitsubishi Chemical), 9.3% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95.

After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 $m^2$ on the basis of outer diameter of the hollow fiber type semipermeable membrane.

Example 12

Cellulose triacetate (CTA, Daicel, LT35) (41% by weight), 35.2% by weight of N-methyl-2-pyrrolidone (NMP, Mitsubishi Chemical), 23.5% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 2. Effective membrane area of this hollow fiber type semipermeable membrane element was about 67 $m^2$ on the basis of outer diameter of the hollow fiber type semipermeable membrane.

Comparative Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 40 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 $m^2$ on the basis of outer diameter of the hollow fiber type semipermeable membrane.

Comparative Example 2

Cellulose triacetate (CTA, Daicel, LT35) (37% by weight), 53.3% by weight of N-methyl-2-pyrrolidone (NMP, Mitsubishi Chemical), 9.4% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 3

Cellulose triacetate (CTA, Daicel, LT35) (47% by weight), 44.8% by weight of N-methyl-2-pyrrolidone (NMP, Mitsubishi Chemical), 7.9% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 4

Cellulose triacetate (CTA, Daicel, LT35) (41% by weight), 58.7% by weight of N-methyl-2-pyrrolidone (NMP, Mitsubishi Chemical), and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped into water of 60° C. and subjected to an annealing treatment by hot water for 20 minutes. Then, the hollow fiber type semipermeable membrane was dipped into water of 85° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 5

A hollow fiber type semipermeable membrane was prepared according to the same manner as in Example 1, except that the hollow fiber type semipermeable membrane obtained by a step of annealing treatment by hot water was dipped into water of 85° C. and subjected to an annealing treatment by hot water for 20 minutes, and then dipped into water of 99.8° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 6

A hollow fiber type semipermeable membrane was prepared according to the same manner as in Example 1, except that the hollow fiber type semipermeable membrane obtained by a step of annealing treatment by hot water was dipped into water of 85° C. and subjected to an annealing treatment by hot water for 20 minutes, and then dipped into water of 75° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 7

A hollow fiber type semipermeable membrane was prepared according to the same manner as in Example 1, except that the hollow fiber type semipermeable membrane obtained by a step of annealing treatment by hot water was dipped into water of 30° C. and subjected to an annealing treatment by hot water for 20 minutes, and then dipped into water of 75° C. and subjected to an annealing treatment by hot water for 20 minutes. The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 8

A hollow fiber type semipermeable membrane was prepared according to the same manner as in Example 1, except that the hollow fiber type semipermeable membrane obtained by a step of annealing treatment by hot water was dipped into water of 30° C. and subjected to an annealing treatment by hot water for 20 minutes, and then dipped into water of 99.8° C. and subjected to an annealing treatment by hot water for 20 minutes. The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 3. Effective membrane area of this hollow fiber type semipermeable membrane element was about 67 m² on the basis of outer diameter of the hollow fiber type semipermeable membrane.

Comparative Example 9

A hollow fiber type semipermeable membrane was prepared according to the same manner as in Example 6, except that the temperature for the annealing treatment by hot water was changed to 60° C. and the treatment was carried out for one time. The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 67 m² on the basis of outer diameter of the hollow fiber type semipermeable membrane.

Comparative Example 10

A hollow fiber type semipermeable membrane was prepared according to the same manner as in Example 1 except that the hollow fiber type semipermeable membrane has inner diameter of 72 μm, outer diameter of 160 μm and hollow ratio of 20%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 73 m² on the basis of outer diameter of the hollow fiber type semipermeable membrane.

Comparative Example 11

A hollow fiber type semipermeable membrane was prepared according to the same manner as in Example 1 except that the hollow fiber type semipermeable membrane has inner diameter of 212 μm, outer diameter of 300 μm and hollow ratio of 50%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 39 m² on the basis of outer diameter of the hollow fiber type semipermeable membrane.

Comparative Example 12

A hollow fiber type semipermeable membrane was prepared according to the same manner as in Example 6, except that the hollow fiber type semipermeable membrane obtained by a step of annealing treatment by hot water was dipped into water of 85° C. and subjected to an annealing treatment by hot water for 20 minutes, and then dipped into water of 99.8° C. and subjected to an annealing treatment by hot water for 20 minutes.

The resulting hollow fiber type semipermeable membrane had inner diameter of 100 μm, outer diameter of 175 μm and hollow ratio of 33%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 67 m$^2$ on the basis of outer diameter of the hollow fiber type semipermeable membrane.

Comparative Example 13

Cellulose triacetate (CTA, Daicel, LT35) (39% by weight), 41.0% by weight of N-methyl-2-pyrrolidone (NMP, Mitsubishi Chemical), 19.4% by weight of triethylene glycol (TEG, Mitsubishi Chemical), 0.3% by weight of tartaric acid (Nacalai Tesque), and 0.3% by weight of ethyl diethanol amine (Nacalai Tesque) were uniformly dissolved at 180° C. to give a dope. The resulting dope was defoamed in vacuo, extruded from an arc-type nozzle (divided into three) at 158° C. into the space which is isolated from the outer air and, after space time of 0.03 second, dipped into a coagulating bath of 10° C. comprising NMP/EG/water in 21.7/9.3/69.0. After that, the hollow fiber type semipermeable membrane was washed by a multistage inclination gutter method and shaken off when the membrane was still in a wet state. The resulting hollow fiber type semipermeable membrane was dipped into water of 88° C. and subjected to an annealing treatment by hot water for 20 minutes.

The resulting hollow fiber type semipermeable membrane had inner diameter of 86 μm, outer diameter of 180 μm and hollow ratio of 23%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 65 m$^2$ on the basis of outer diameter of the hollow fiber type semipermeable membrane.

Comparative Example 14

Cellulose acetate (CA, Daicel, L30) (36% by weight), 42.0% by weight of N,N-dimethylacetamide (DMAC, Mitsubishi Chemical), 20.9% by weight of acetylated tetraethylene glycol (Nacalai Tesque), 0.6% by weight of phthalic acid (Nacalai Tesque), and 0.5% by weight of diisopropanolamine (Nacalai Tesque) were uniformly dissolved at 180° C. to give a dope. The resulting dope was defoamed in vacuo, extruded from an arc-type nozzle (divided into three) at 158° C. into the space which is isolated from the outer air and, after space time of 0.03 second, dipped into a coagulating bath of 10° C. comprising NMP/EG/water in 21.7/9.3/69.0. After that, the hollow fiber type semipermeable membrane was washed by a multistage inclination gutter method and shaken off when the membrane was still in a wet state. The resulting hollow fiber type semipermeable membrane was dipped into water of 99° C. and subjected to an annealing treatment by hot water for 20 minutes.

The resulting hollow fiber type semipermeable membrane had inner diameter of 86 μm, outer diameter of 180 μm and hollow ratio of 23%.

Module of about 100 cm length for the evaluation was prepared using the hollow fiber type semipermeable membrane of this Comparative Example. Permeation flow rate, salt rejection rate, and permeation flow rate ratio due to pressure difference were measured using the module. Also, element for measuring the permeation flow rate due to concentration difference was prepared with about 70 cm effective length of the hollow fiber type semipermeable membrane. Permeation flow rate was measured using the element. Results of the evaluation are summarized in Table 4. Effective membrane area of this hollow fiber type semipermeable membrane element was about 65 m$^2$ on the basis of outer diameter of the hollow fiber type semipermeable membrane.

TABLE 1

|  |  | Example 1 | Example 2 | Example 3 | Example 4 | Example 5 | Example 6 |
|---|---|---|---|---|---|---|---|
| Dope | polymer concentration (% by weight) | 41 | 41 | 44 | 41 | 41 | 41 |
|  | solvent (% by weight) | 49.9 | 52.8 | 47.3 | 49.9 | 49.9 | 41.1 |
|  | non-solvent (% by weight) | 8.8 | 5.9 | 8.4 | 8.8 | 8.8 | 17.6 |
|  | organic acid etc. (% by weight) | 0.3 | 0.3 | 0.3 | 0.3 | 0.3 | 0.3 |
|  | solvent/non-solvent (ratio by weight) | 85/15 | 90/10 | 85/15 | 85/15 | 85/15 | 70/30 |
| Annealing treatment temperature by hot water (° C.) | first time | 60 | 60 | 60 | 60 | 80 | 80 |
|  | second time | 85 | 85 | 85 | 85 | 98 | 98 |
| Dimension | inner diameter (μm) | 100 | 100 | 100 | 158 | 100 | 86 |
|  | outer diameter (μm) | 175 | 175 | 175 | 250 | 175 | 175 |
|  | hollow ratio (%) | 33 | 33 | 33 | 40 | 33 | 24 |
|  | length (mm) | 1000 | 1000 | 1000 | 1000 | 1000 | 1000 |
|  | thickness of dense layer (μm) | 2 | 2 | 3 | 2 | 3 | 12 |

TABLE 1-continued

|  |  | Example 1 | Example 2 | Example 3 | Example 4 | Example 5 | Example 6 |
|---|---|---|---|---|---|---|---|
| Water permeability due to pressure difference | permeation flow rate (L/m²/day) | 130 | 120 | 100 | 155 | 100 | 100 |
|  | salt rejection rate (%) | 99.8 | 99.8 | 99.9 | 99.8 | 99.8 | 99.8 |
| Water permeability due to concentration difference | permeation flow rate (L/m²/day) | 42 | 39 | 43 | 59 | 36 | 33 |
| Pressure resistance | flow rate ratio (—) | 0.96 | 0.93 | 1.00 | 0.96 | 1.00 | 1.00 |

TABLE 2

|  |  | Example 7 | Example 8 | Example 9 | Example 10 | Example 11 | Example 12 |
|---|---|---|---|---|---|---|---|
| Dope | polymer concentration (% by weight) | 41 | 41 | 43 | 39.7 | 38 | 41 |
|  | solvent (% by weight) | 49.9 | 49.9 | 56.7 | 42 | 52.4 | 35.2 |
|  | non-solvent (% by weight) | 8.8 | 8.8 | 0 | 17.6 | 9.3 | 23.5 |
|  | organic acid etc. (% by weight) | 0.3 | 0.3 | 0.3 | 0.7 | 0.3 | 0.3 |
|  | solvent/non-solvent (ratio by weight) | 85/15 | 85/15 | 10/0 | 70/30 | 85/15 | 60/40 |
| Annealing treatment temperature by hot water (° C.) | first time | 42 | 78 | 42 | 80 | 60 | 60 |
|  | second time | 99 | 87 | 85 | 98 | 85 | 85 |
| Dimension | inner diameter (μm) | 100 | 100 | 100 | 86 | 100 | 100 |
|  | outer diameter (μm) | 175 | 175 | 175 | 175 | 175 | 175 |
|  | hollow ratio (%) | 33 | 33 | 33 | 24 | 33 | 33 |
|  | length (mm) | 1000 | 1000 | 1000 | 1000 | 1000 | 1000 |
|  | thickness of dense layer (μm) | 3 | 2 | 1 | 11 | 2 | 15 |
| Water permeability due to pressure difference | permeation flow rate (L/m²/day) | 90 | 110 | 110 | 90 | 160 | 140 |
|  | salt rejection rate (%) | 99.9 | 99.8 | 99.9 | 99.7 | 99 | 98 |
| Water permeability due to concentration difference | permeation flow rate (L/m²/day) | 39 | 36 | 47 | 30 | 50 | 45 |
| Pressure resistance | flow rate ratio (—) | 1.00 | 0.97 | 0.90 | 1.00 | 0.93 | 1.00 |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Dope | polymer concentration (% by weight) | 41 | 37 | 47 | 41 | 41 | 41 | 41 | 41 |
|  | solvent (% by weight) | 49.9 | 52.4 | 44.8 | 58.7 | 49.9 | 49.9 | 49.9 | 49.9 |
|  | non-solvent (% by weight) | 8.8 | 9.3 | 7.9 | 0 | 8.8 | 8.8 | 8.8 | 8.8 |
|  | organic acid etc. (% by weight) | 0.3 | 0.3 | 0.3 | 0.3 | 0.3 | 0.3 | 0.3 | 0.3 |
|  | solvent/non-solvent (ratio by weight) | 85/15 | 85/15 | 85/15 | 10/0 | 85/15 | 85/15 | 85/15 | 85/15 |
| Annealing treatment temperature by hot water (° C.) | first time | 60 | 60 | 60 | 60 | 85 | 85 | 30 | 30 |
|  | second time | — | 85 | 85 | 85 | 99.8 | 75 | 99.8 | 99.8 |
| Dimension | inner diameter (μm) | 100 | 100 | 100 | 100 | 100 | 100 | 100 | 100 |
|  | outer diameter (μm) | 175 | 175 | 175 | 175 | 175 | 175 | 175 | 175 |
|  | hollow ratio (%) | 33 | 33 | 33 | 33 | 33 | 33 | 33 | 33 |
|  | length (mm) | 1000 | 1000 | 1000 | 1000 | 1000 | 1000 | 1000 | 1000 |
|  | thickness of dense layer (μm) | 2 | 2 | 4 | 1 | 3 | 3 | 3 | 3 |
| Water permeability due to pressure difference | permeation flow rate (L/m²/day) | 270 | 160 | 60 | 105 | 50 | 110 | 40 | 40 |
|  | salt rejection rate (%) | 97 | 97.2 | 99.9 | 99.9 | 99.9 | 99.9 | 98 | 98 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Water permeability due to concentration difference | permeation flow rate (L/m²/day) | 27 | 26 | 25 | 45 | 27 | 13 | 10 | 10 |
| Pressure resistance | flow rate ratio (—) | 0.70 | 0.94 | 0.98 | 0.82 | 1.00 | 0.97 | 1.00 | 1.00 |

TABLE 4

|  |  | Comparative Example 9 | Comparative Example 10 | Comparative Example 11 | Comparative Example 12 | Comparative Example 13 | Comparative Example 14 |
|---|---|---|---|---|---|---|---|
| Dope | polymer concentration (% by weight) | 41 | 41 | 41 | 41 | 39 | CA36 |
|  | solvent (% by weight) | 41.1 | 49.9 | 49.9 | 41.1 | 41 | DMAC 42 |
|  | non-solvent (% by weight) | 17.6 | 8.8 | 8.8 | 17.6 | TrEG 19.4 | acetylated PEG(n-4) 20.9 |
|  | organic acid etc. (% by weight) | 0.3 | 0.3 | 0.3 | 0.3 | tartaric acid 0.3 + ethyl diethanol amine 0.3 | phthalic acid 0.6 + diisopropanol amine 0.5 |
|  | solvent/non-solvent (ratio by weight) | 70/30 | 85/15 | 85/15 | 70/30 | 68/32 | 66/34 |
| Annealing treatment temperature by hot water (° C.) | first time | 60 | 60 | 60 | 85 | 88 | 88 |
|  | second time | — | 85 | 85 | 99.8 | — | — |
| Dimension | inner diameter (μm) | 100 | 72 | 212 | 100 | 86 | 86 |
|  | outer diameter (μm) | 175 | 160 | 300 | 175 | 180 | 180 |
|  | hollow ratio (%) | 33 | 20 | 50 | 33 | 23 | 23 |
|  | length (mm) | 1000 | 1000 | 1000 | 1000 | 1000 | 1000 |
|  | thickness of dense layer (μm) | 8 | 2 | 2 | 13 |  |  |
| Water permeability due to pressure difference | permeation flow rate (L/m²/day) | 200 | 100 | 160 | 45 | 125 | 140 |
|  | salt rejection rate (%) | 85 | 99.8 | 99.8 | 99.8 | 99.68 | 96.8 |
| Water permeability due to concentration difference | permeation flow rate (L/m²/day) | 6 | 26 | 50 | 16 | 28 | 20 |
| Pressure resistance | flow rate ratio (—) | 0.88 | 1.00 | 0.65 | 1.00 | 0.84 | 0.80 |

Note:
TrEG stands for triethylene glycol,
CA stands for cellulose acetate,
DMAC stands for dimethylacetamide, and
acetylated PEG(n-4) stands for acetylated tetraethylene glycol.

As will be apparent from the above results, all of the hollow fiber type semipermeable membranes of Examples 1 to have a high water permeability which utilizes the concentration difference as a driving force, and the flow rate ratio which is an index for the pressure resistance is 0.9 or more. Accordingly, it is possible to efficiently obtain the water and the pressure for generating the energy utilizing the concentration difference as a driving force, with a small installing space. On the contrary, in Comparative Example 1, the annealing treatment by hot water is conducted only once and, in addition, the temperature for the annealing treatment is low whereby densification of the membrane structure is insufficient. Accordingly, in the water treatment utilizing the concentration difference as a driving force, the salt leaks out and the concentration difference via the semipermeable membrane is not sufficiently achieved whereupon the water permeability utilizing the concentration difference as a driving force is low and the permeation flow rate ratio which is an index for the pressure resistance is also low. In Comparative Example 2, polymer concentration is low, the annealing treatment by hot water is conducted only once and, in addition, the temperature for the annealing treatment is low whereby densification of the structure as a whole membrane is insufficient. Accordingly, in the water treatment utilizing the concentration difference as a driving force, the salt leaks out and the concentration difference via the semipermeable membrane is not sufficiently achieved whereupon the water permeability utilizing the concentration difference as a driving force is low. In Comparative Example 3, presumably because the polymer concentration of the dope is high, the prepared hollow fiber type semipermeable membrane has low water permeability. In Comparative Example 4, solvent/non-solvent ratio is large, solvent evaporation during air gap is probably not fully promoted and thus structure on the membrane surface is not so densified as expected. Further, the annealing treatment by hot water is conducted only once and, in addition, the temperature for the annealing treatment is low whereby selectivity is not high. Accordingly, in the water treatment utilizing the concentration difference as a driving force, the salt leaks out and the concentration difference via the semipermeable membrane is not sufficiently achieved whereupon the water permeability utilizing the concentration difference as a driving force is low. In Comparative Example 5, since the annealing treatment temperature by hot water is high in both of the first and the second steps, membrane structure of the support layer cannot be maintained and the dense layer is too much densified whereupon the water permeability becomes low and the water permeability utilizing the concentration difference as a driving force is low. In Comparative Example 6, since the annealing treatment temperature by hot water of the first step is high, the annealing treatment by hot water takes place under such a state that removal of the solvent is insufficient whereby the membrane structure of a high communicative connection property of the support layer cannot be maintained and the water permeability utilizing the concentration difference as a driving force is low. In Comparative Example 7, since the annealing treatment temperature by hot water in the first step is low, removal of the solvent is insufficient and, further since the annealing treatment temperature by hot water in the second step is also low, the structure of the support layer cannot be maintained and, in addition, densification of the dense layer is insufficient whereby the water permeability utilizing the concentration difference as a driving force is low. In Comparative Example 8, since the annealing treatment temperature by hot water in the first step is low, removal of the solvent is insufficient and the membrane structure of high communicative connection property of the support layer cannot be maintained in the annealing treatment by hot water in the second step and, further since the annealing treatment temperature by hot water in the second step is too high, densification of the dense layer proceeds too much whereby the water permeability utilizing the concentration difference as a driving force is low. In Comparative Example 9, since the solvent/non-solvent ratio is not high, the dense layer becomes thick and, further since the annealing treatment temperature by hot water is low, densification of the dense layer is insufficient and salt rejection rate is low whereby the water permeability by means of the concentration difference is low. In Comparative Example 10, since the hollow ratio is small and thickness of the hollow fiber type semipermeable membrane is large and, further due to the affection of the flow pressure loss in the bore, the water permeability is low. In Comparative Example 11, although the water permeability is high since the hollow ratio is large and thickness of the hollow fiber type semipermeable membrane is small, the permeation flow rate ratio which is an index for the pressure resistance is low. In Comparative Example 12, since the annealing treatment temperature by hot water is high in both of the first and the second steps, the membrane structure of the support layer cannot be maintained and, further since the dense layer is too much densified, water permeability is low whereby the water permeability utilizing the concentration difference as a driving force is low. In Comparative Example 13, although the polymer concentration of the dope is low, the annealing treatment temperature by hot water is within an appropriate range and, although the water permeability and salt rejection property due to the pressure are good, the structure of a support layer of a highly communicative connection state cannot be maintained because the annealing treatment by hot water is done in one step whereby the water permeability utilizing the concentration difference as a driving force is low. That is presumably because the concentration polarization at the support layer is large. In Comparative Example 14, since the polymer concentration of the dope is low, the salt rejection rate is low and, further since the annealing treatment by hot water is done in one step, the water permeability utilizing the concentration difference as a driving force is low.

INDUSTRIAL APPLICABILITY

The hollow fiber type semipermeable membrane of the present invention is designed so as to achieve high water permeating property of the membrane and, high permeation flow rate utilizing the concentration difference in salt as a driving force due to high selectivity for water and salt. Accordingly, it is very useful in such a field wherein energy is generated utilizing the concentration difference as a driving force.

The invention claimed is:

1. A membrane comprising a hollow fiber type semipermeable membrane,
   wherein the hollow fiber type semipermeable membrane has a permeation flow rate of 30 to 70 L/m$^2$/day when an aqueous solution of 25° C. having a sodium chloride concentration of 35 g/L and pressure of 1.0 MPa is flown into and contacted with an outer side of the hollow fiber type semipermeable membrane having a length of about 70 cm while freshwater of 25° C. having sodium chloride concentration of 0 g/L is flown into an inner side of one open end of the hollow fiber type semipermeable membrane and discharged from another open end at 10 kPa or less, wherein the permeation flow rate is measured under such a condition that twice the permeation flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the inner side of the hollow fiber type semipermeable membrane is equal to 10% of said permeation flow rate;
   wherein when an aqueous solution having a sodium chloride concentration of 1.5 g/L is filtered from the outer side to the inner side of the hollow fiber type semipermeable membrane at 25° C. and under a pressure of 3.0 MPa, a permeation flow rate ratio is 0.85 to 1.0, the permeation flow rate ratio being a ratio of the value of the permeation flow rate after 24 hours to the value of the permeation flow rate after 1 hour;
   wherein the hollow fiber type semipermeable membrane has a salt rejection rate of 98.5 to 99.9%;
   wherein cellulose triacetate is a raw material of the hollow fiber type semipermeable membrane;
   wherein the hollow fiber type semipermeable membrane comprises a support layer and a dense layer; and the dense layer has a thickness of 0.1 to 15 μm;
   wherein an outer diameter of the hollow fiber type semipermeable membrane is 100 to 280 μm;
   wherein an inner diameter of the hollow fiber type semipermeable membrane is 50 to 200 μm; and
   wherein a hollow ratio of the hollow fiber type semipermeable membrane is 24 to 42%.

2. A method for manufacturing the hollow fiber type semipermeable membrane mentioned in claim 1, comprising the steps of: discharging a dope into a coagulating liquid from a nozzle via an air gap to coagulate followed by washing; and treating the resulting hollow fiber type semipermeable membrane by dipping into water of 40 to 80° C. and further treating by dipping into water of 85 to 99.5° C.

3. A hollow fiber type semipermeable membrane module, comprising the hollow fiber type semipermeable membrane as claimed in claim 1.

4. A water treatment method comprising the steps of: introducing an aqueous solution having high concentration into the hollow fiber type semipermeable membrane module mentioned in claim 3; contacting the aqueous solution having high concentration with an aqueous solution having low concentration via the hollow fiber type semipermeable membrane;

and taking out freshwater from the aqueous solution having low concentration.

5. The method for the water treatment according to claim 4, wherein the pressure of the aqueous solution having high concentration at the outlet of the module is 0.5 to 3.0 MPa.

6. The membrane according to claim 1, wherein the hollow fiber type semipermeable membrane has a thickness of 25 to 115 μm.

7. The membrane according to claim 1, wherein the dense layer has a thickness of 2 to 15 μm.

* * * * *